United States Patent
Ballantine

(10) Patent No.: US 11,773,001 B2
(45) Date of Patent: Oct. 3, 2023

(54) SYSTEMS AND METHODS OF ELECTROCHEMICAL HYDROGEN GENERATION TO PROVIDE A REDUCING AMBIENT FOR INDUSTRIAL FABRICATION

(71) Applicant: OHMIUM INTERNATIONAL, Inc., Incline Village, NV (US)

(72) Inventor: Arne Ballantine, Incline Village, NV (US)

(73) Assignee: Ohmium International, Inc., Incline Village, NV (US)

(*) Notice: Subject to any disclaimer, the term of this patent is extended or adjusted under 35 U.S.C. 154(b) by 368 days.

(21) Appl. No.: 17/122,813

(22) Filed: Dec. 15, 2020

(65) Prior Publication Data

US 2021/0179471 A1     Jun. 17, 2021

Related U.S. Application Data

(60) Provisional application No. 62/948,958, filed on Dec. 17, 2019.

(51) Int. Cl.
| | | |
|---|---|---|
| C03B 18/20 | (2006.01) | |
| C03B 5/235 | (2006.01) | |
| C25B 1/04 | (2021.01) | |
| C25B 1/50 | (2021.01) | |
| C25B 9/17 | (2021.01) | |
| C25B 15/08 | (2006.01) | |
| B01D 53/30 | (2006.01) | |
| B01D 53/32 | (2006.01) | |
| B01D 53/047 | (2006.01) | |

(52) U.S. Cl.
CPC ............ *C03B 18/20* (2013.01); *B01D 53/047* (2013.01); *B01D 53/30* (2013.01); *B01D 53/326* (2013.01);

(Continued)

(58) Field of Classification Search
CPC ..... C03B 18/20; C03B 5/2353; B01D 53/047; B01D 53/30; B01D 53/326;

(Continued)

(56) References Cited

U.S. PATENT DOCUMENTS

| | | | |
|---|---|---|---|
| 8,669,499 B2 | 3/2014 | Conrad | |
| 2003/0010061 A1* | 1/2003 | Ha | F02C 6/10 65/157 |

(Continued)

FOREIGN PATENT DOCUMENTS

| | | | | |
|---|---|---|---|---|
| KR | 2014095240 A | * | 8/2014 | |
| WO | WO 2011-088515 A1 | | 7/2011 | |
| WO | WO-2011088515 A1 | * | 7/2011 | ........... C03B 19/108 |

OTHER PUBLICATIONS

Ballantine, A. et al., "Electrochemical Devices, Modules, and Systems for Hydrogen Generation and Methods of Operating Thereof," U.S. Appl. No. 17/101,232, filed Nov. 23, 2020.

(Continued)

*Primary Examiner* — Joseph J Dallo
(74) *Attorney, Agent, or Firm* — POLSINELLI PC

(57) ABSTRACT

A method includes electrolyzing water into hydrogen, combining the hydrogen with nitrogen to generate forming gas, delivering the forming gas to a reducing environment zone, and processing an intermediate material into a product material in the reducing environment zone. The step of processing the intermediate material into the product material may include processing a glass melt into a float glass ribbon on a tin melt and then cooling the float glass ribbon into sheet glass.

18 Claims, 5 Drawing Sheets

(52) U.S. Cl.
CPC .............. *C03B 5/2353* (2013.01); *C25B 1/04* (2013.01); *C25B 1/50* (2021.01); *C25B 9/17* (2021.01); *C25B 15/08* (2013.01); *B01D 2256/10* (2013.01); *B01D 2256/12* (2013.01); *B01D 2257/104* (2013.01); *B01D 2259/45* (2013.01)

(58) Field of Classification Search
CPC ............ B01D 2256/10; B01D 2256/12; B01D 2257/104; B01D 2259/45; C25B 1/04; C25B 1/50; C25B 9/17; C25B 15/08; C25B 1/02; C25B 15/023; C25B 15/081; Y02P 40/50; Y02E 60/36
See application file for complete search history.

(56) References Cited

U.S. PATENT DOCUMENTS

| | | | |
|---|---|---|---|
| 2003/0068544 A1* | 4/2003 | Cisar | H01M 4/921 429/524 |
| 2009/0126405 A1 | 5/2009 | DeAngelis et al. | |
| 2015/0128645 A1 | 5/2015 | Hojaji et al. | |
| 2018/0312420 A1 | 11/2018 | Bandyo et al. | |

OTHER PUBLICATIONS

Ballantine, A. et al., "Modular Systems for Hydrogen Generation and Methods of Operating Thereof," U.S. Appl. No. 17/101,251, filed Nov. 23, 2020.

Ballantine, A. et al., "Systems and Methods of Ammonia Synthesis," U.S. Appl. No. 17/101,224, filed Nov. 23, 2020.

Chisholm, G. et al., "3D printed flow plates for the electrolysis of water: an economic and adaptable approach to device manufacture," Energy Environ. Sci., vol. 7, pp. 3026-3032, (2014) DOI: 10.1039/c4ee01426j.

https://info.glass.com/what-is-the-float-glass-process/#:~:text=In%20the%20float%20glass%20process,to%20form%20a%20flat%20surface.&text=The%20glass%20is%20now%20perfectly%20flat%20and%20parallel. Visited Dec. 15, 2020.

Notification of Transmittal of the International Search Report and the Written Opinion of the International Searching Authority for International Patent Application No. PCT/US2020/065152, dated Apr. 2, 2021, 9 pages.

* cited by examiner

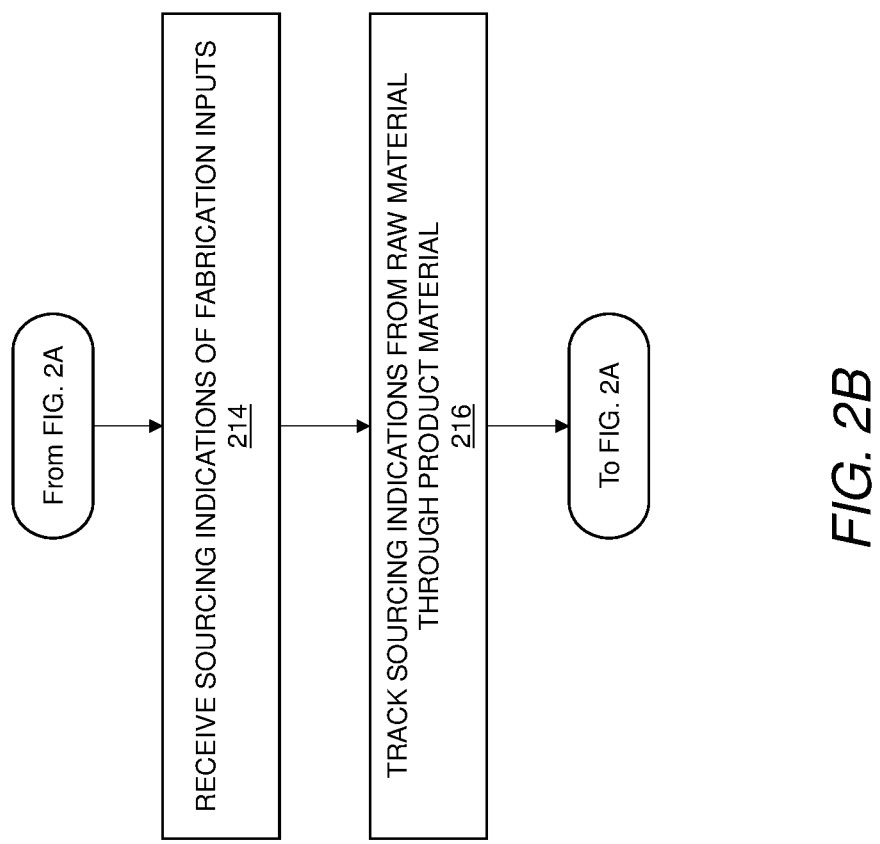

SYSTEMS AND METHODS OF ELECTROCHEMICAL HYDROGEN GENERATION TO PROVIDE A REDUCING AMBIENT FOR INDUSTRIAL FABRICATION

CROSS-REFERENCE TO RELATED APPLICATIONS

This application claims the benefit of U.S. Provisional Patent Application No. 62/948,958, filed on Dec. 17, 2019, the entire contents of which are incorporated herein by reference.

FIELD

The present disclosure is directed to generating a reducing ambient for industrial production in general and, more specifically, to systems and methods of electrochemically generating hydrogen to provide a reducing ambient for industrial material fabrication.

BACKGROUND

Sheet glass is a type of glass having a variety of uses, with some common uses including building construction and automobile windshields. Sheet glass is formed using a float process that requires an oxygen-free environment. Such an environment is achieved using a forming gas, which is a mixture of an inert gas and a reducing gas. In the production of sheet glass, forming gas is typically a mixture of nitrogen and hydrogen. This mixture is injected into the appropriate sections of the sheet glass process, and the forming gas reacts with any oxygen leaks in those sections. Through this scavenging process, oxygen is prevented from being present in a concentration that oxidizes a tin bath and interferes with the quality of the sheet glass being produced.

SUMMARY

In one embodiment, a system comprises a nitrogen source, an electrolyzer, a fabrication assembly comprising a reducing environment zone operable to receive an intermediate material and process the intermediate material into a product material, and a blending circuit in fluid communication with the nitrogen source, the electrolyzer, and the reducing environment zone, and the blending circuit configured to combine a nitrogen stream from the nitrogen source with a hydrogen stream from the electrolyzer to mix a forming gas and to flow the forming gas from the blending circuit into the reducing environment zone of the fabrication assembly.

In one embodiment, the fabrication assembly comprises a float glass fabrication assembly which is fluidly connected to the electrolyzer via a hydrogen stream conduit, the blending circuit and a forming gas stream conduit.

In one embodiment, a method includes electrolyzing water into hydrogen, combining the hydrogen with nitrogen to generate forming gas, delivering the forming gas to a reducing environment zone, and processing an intermediate material into a product material in the reducing environment zone.

In one embodiment, the method also includes forming the intermediate material from raw material in an oxidizing environment zone. In one embodiment, forming the intermediate material from the raw material in the oxidizing environment zone comprises forming a glass melt from a raw material powder in a melting furnace, and processing the intermediate material into the product material comprises processing the glass melt into a float glass ribbon on a tin melt, and then cooling the float glass ribbon into sheet glass.

BRIEF DESCRIPTION OF THE FIGURES

FIGS. 2A and 2B are flow charts of exemplary methods of oxygen-free fabrication according to various embodiments, the methods including electrochemically pumping hydrogen and recirculating at least a portion of the electrochemically pumped hydrogen to an inlet of a reactor.

Like reference symbols in the various drawings indicate like elements.

DETAILED DESCRIPTION

Figure 1A:
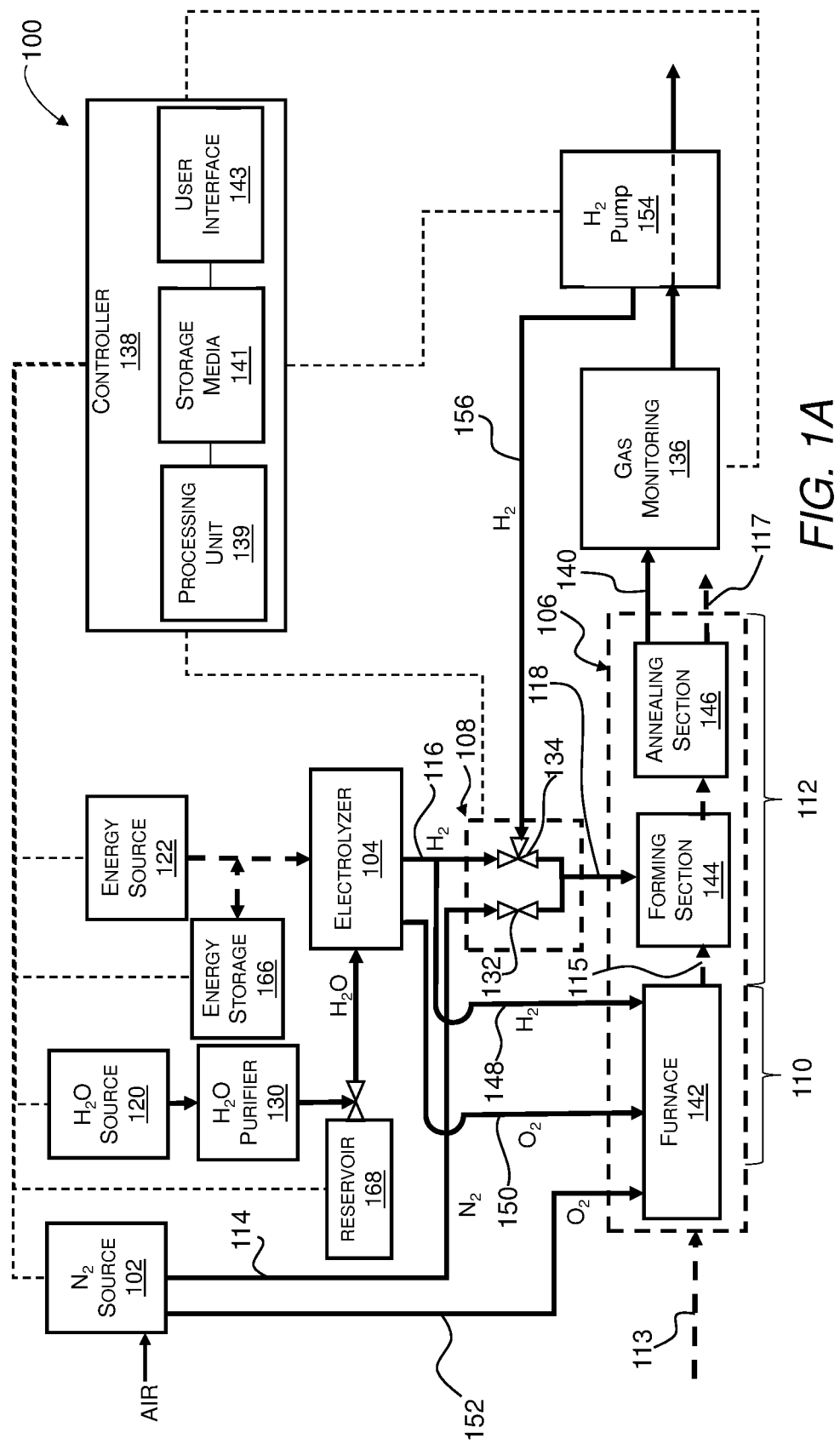
FIG. 1A is a block diagram of a system of a first embodiment for scavenging oxygen in oxygen-free fabrication, the system including a fabrication assembly, a nitrogen source, an electrolyzer, and a blending circuit in which a nitrogen stream from the nitrogen source is combinable with a hydrogen stream from the electrolyzer to mix a forming gas and direct the forming gas to a reducing environment of the fabrication assembly.

The embodiments will now be described more fully hereinafter with reference to the accompanying figures, in which exemplary embodiments are shown. The foregoing may, however, be embodied in many different forms and should not be construed as limited to the exemplary embodiments set forth herein. All fluid flows may flow through conduits (e.g., pipes and/or manifolds) unless specified otherwise.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

As used herein, the term "oxygen-free" shall be understood to include an environment having significantly less oxygen than air and, more specifically, in a volumetric concentration that does not interact substantially with processes that are adversely impacted by the presence of oxygen. Thus, while an oxygen-free environment may be devoid of oxygen (i.e., having zero volume percent oxygen), an oxygen-free environment may contain a small amount of oxygen in some instances and the amount of acceptable oxygen in an oxygen-free environment may vary. In some instances, an oxygen-free environment may be less than about 1 vol. percent oxygen (e.g., less than about 0.3 vol. percent oxygen, such as 0.001 to 0.1 vol. percent oxygen).

In the description that follows, various aspects of systems and methods are described in the context of glass fabrication, given that glass fabrication has widespread industrial applicability and is demonstrative of various different features of systems and methods of the present disclosure. Nevertheless, unless otherwise specified or made clear from the context, it shall be understood that any one or more of the various different systems and methods described herein may be additionally, or alternatively, used to form any one or more of various different reducing ambient fabrication contexts. For example, unless a contrary intent is indicated, any one or more of the various different systems and methods described herein may be used to form a reducing environment in any one or more of various different applications in which a reducing environment or reducing carrier gas may be utilized. As an example, any one or more of the various different systems and methods described herein may be used in metals processing, where a reducing environment is maintained using forming gas. Additionally, or alternatively, any one or more of the various different systems and methods described herein may be used in semiconductor fabrication processes. Further, with respect to semiconductor fabrication processes in which forming gas is not necessarily used, any one or more of the various different systems and methods described herein may be used in semiconductor processes, such as plasma deposition (e.g., chemical vapor deposition or atomic layer deposition) or plasma etch processes, in which hydrogen may be used as a carrier gas. With respect to such semiconductor fabrication processes, hydrogen pumping residual gases after a downstream scrubber may remove etch chemicals and, in turn, may facilitate improved plant efficiency.

Forming gas used in industrial production, such as industrial materials production, for example in sheet glass production is formed from respective tanks or bottles of nitrogen and hydrogen on-site or off-site. However, such formation of forming gas can be associated with significant emissions, thus contributing to the total emissions associated with sheet glass production. Further, because forming gas is blended from tanks or bottles of its constituent components, the availability of such tanks or bottles represents a potential source of disruption in the process of fabricating sheet glass. Accordingly, one embodiment of the present disclosure provides an electrochemical hydrogen generation apparatus and method which reduce emissions associated with blending forming gas without disrupting the underlying industrial fabrication process, such as the sheet glass fabrication process.

Figure 1B:
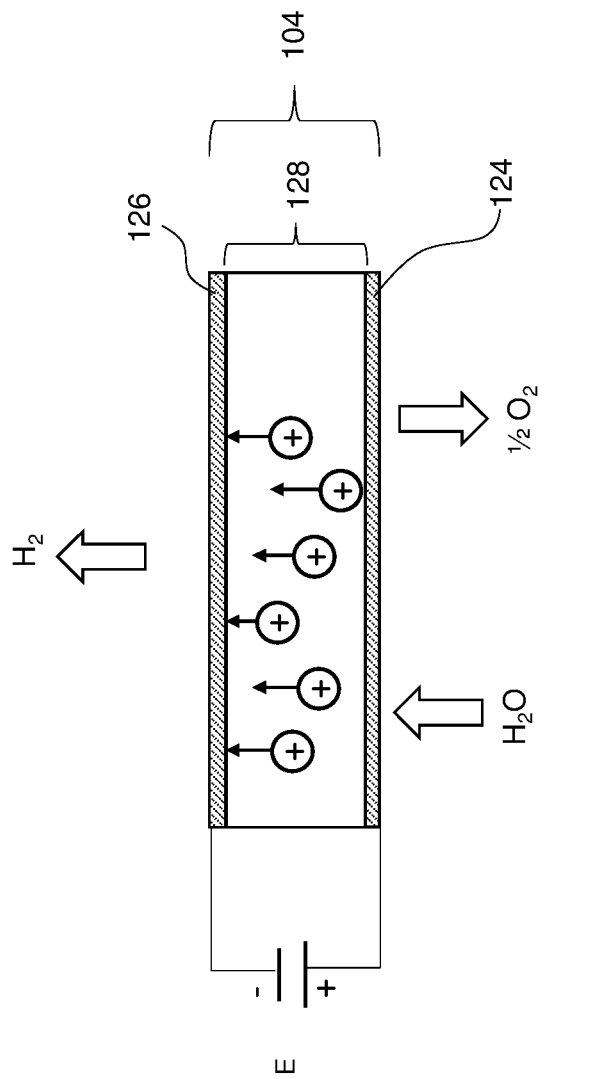
FIG. 1B is a schematic representation of the electrolyzer of the system of FIG. 1A, with the electrolyzer including a proton exchange membrane (PEM) between an anode and a cathode.
Figure 1C:
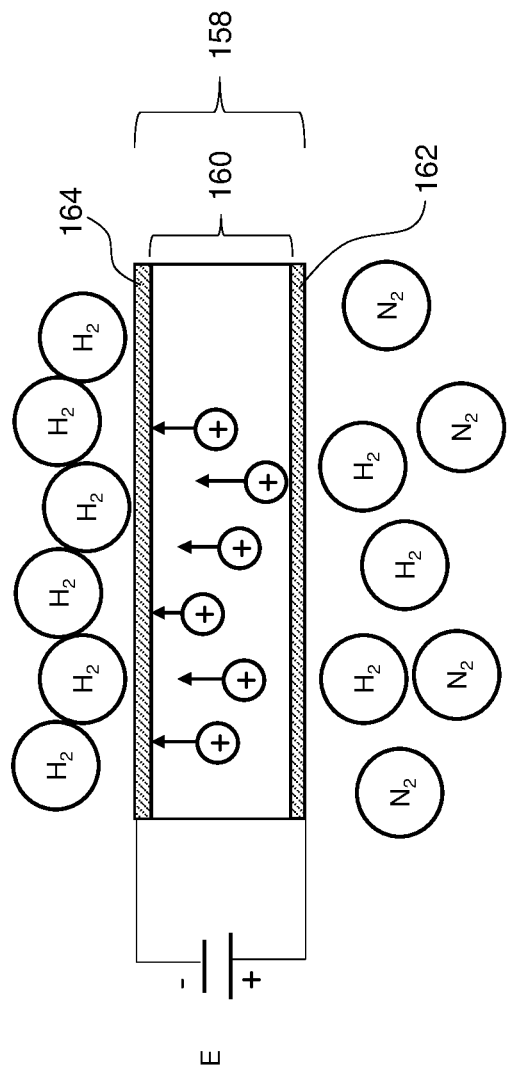
FIG. 1C is a schematic representation of an electrochemical cell of a hydrogen pump of the system of FIG. 1A.

Referring now to FIGS. 1A-1C, a system 100 for material fabrication, such as the fabrication of sheet glass, may include a nitrogen source 102, an electrolyzer 104, a fabrication assembly 106, and a blending circuit 108. The fabrication assembly 106 may include, for example, an oxidizing environment zone 110 and a reducing environment zone 112. The blending circuit 108 may be in fluid communication with the nitrogen source 102, the electrolyzer 104, and the reducing environment zone 112 of the fabrication assembly 106. As compared to blending forming gas from bottles or tanks of constituent components, the blending circuit 108 may facilitate combining hydrogen and nitrogen into a forming gas on demand to support the needs of the reducing environment zone 112 of the fabrication assembly 106 at any given time while reducing, or even eliminating, the need to store bottles or tanks of forming gas in amounts required to support production throughput of the fabrication assembly 106.

In use, as described in greater detail below, raw material 113 may be introduced into the oxidizing environment zone 110 and formed into an intermediate material 115. In turn, the intermediate material 115 may be moved into the reducing environment zone 112, where the intermediate material 115 may be formed into a product material 117 through one or more processes that are sensitive to the presence of oxygen. The nitrogen source 102 may provide nitrogen the blending circuit 108 along a nitrogen stream 114 (e.g., via a nitrogen stream conduit, such as a pipe or manifold), the electrolyzer 104 may provide hydrogen to the blending circuit 108 along a hydrogen stream 116 (e.g., via a hydrogen stream conduit, such as a pipe or manifold). As also described in greater detail below, the blending circuit 108 may combine nitrogen from the nitrogen stream 114 and hydrogen from the hydrogen stream 116 to mix a forming gas deliverable, via forming gas stream 118 (e.g., via a forming gas stream conduit, such as a pipe or manifold), to the reducing environment zone 112 of the fabrication assembly 106. In the reducing environment zone 112, hydrogen in the forming gas may react with oxygen inadvertently present in the reducing environment zone 112 (e.g., as a result of leaks) in a process referred to herein as scavenging. As compared to forming gas sourced from bottles or tanks of constituent components, the forming gas may be mixed continuously by the blending circuit 108, thus facilitating adjusting the ratio of constituent components of the forming gas according to changing conditions and/or degradation of the reducing environment in the reducing environment zone 112 of the fabrication assembly 106. Further, or instead, the forming gas mixed continuously by the blending circuit 108 may reduce potential interruptions of a fabrication process, such as interruptions associated with supplies of tanks or bottles of one or more constituent components. Additionally, or alternatively, to the extent water for the electrolyzer 104 may be sourced from one or more renewable water sources 120 (such as seawater, treatment of waste water, atmospheric condensation, etc.), and/or energy (e.g., electricity/ electric power) may be sourced from an energy source 122 that comprises one or more renewable energy sources (e.g., solar, wind, hydroelectric, etc.) and used to power one or both of the nitrogen source 102 or the electrolyzer 104, the forming gas mixed by the blending circuit 108 may reduce emissions associated with a fabrication process, as compared to an otherwise identical fabrication process associated with forming gas mixed with constituent components formed from non-renewable energy sources. Thus, as may be appreciated from the foregoing, the forming gas mixed continuously by the blending circuit 108 of the system 100 may facilitate efficient fabrication of a high-quality product while supporting environmentally responsible sourcing of raw materials.

In general, the electrolyzer 104 may receive water from the water source 120 and electricity from the energy source 122 to produce hydrogen for the hydrogen stream 116. The water source 120 may be a renewable water source or a non-renewable source (e.g., municipal water supply). The energy source 122 may be a renewable energy source or a non-renewable energy source (e.g., power grid). For example, the electrolyzer 104 may be close-coupled to the fabrication assembly 106 to facilitate using one or more local resources as the energy source 122, the water source 120, or both. Significantly, as compared to using centralized resources such as an electric grid or a municipal water supply, the use of local resources to produce hydrogen may provide the operator of the system 100 with choices for sourcing electricity and water to reduce cost and/or emissions associated with hydrogen production. Further, or instead, close-coupling the electrolyzer 104 to the fabrication assembly 106 may be useful for reducing cost and complexity associated with material handling, as compared to the transport and storage of hydrogen from one or more geographically separate sources.

In certain implementations, the electrolyzer 104 may include one or more electrochemical cells. For example, as shown in FIG. 1B, the electrolyzer 104 may include an anode 124, a cathode 126, and a medium 128 therebetween. The medium 128 may include any one or more of various different proton exchange media and, in particular, may include a proton exchange membrane (PEM). Purified water provided from the water source 120, via an optional water purifier 130, may flow along the anode 124. The water purifier 130 may be on-site to upgrade waste-water streams for use with the electrolyzer 104. Electricity input from the energy source 122 to the electrolyzer 104 may be coupled to the anode 124 and the cathode 126 to form an electric field across the medium 128. The purified water may be separated into oxygen and pressurized hydrogen in the presence of the electric field across the medium 128. More specifically, oxygen may be formed along the anode 124, and pressurized hydrogen may be formed along the cathode 126 as protons moving through the medium 128 and recombining along the cathode 126. Thus, the cathode 126 may be in fluid communication with the blending circuit 108, via the hydrogen stream 116 (e.g., hydrogen stream conduit), such that the pressurized hydrogen formed from only water and electricity may be delivered to the blending circuit 108 as one component of the forming gas to be mixed by the blending circuit 108. As described in greater detail below, in instances in which the oxidizing environment zone 110 of the fabrication assembly 106 includes a furnace, at least a portion of the oxygen byproduct of the electrolysis process may be directed to the furnace to facilitate cleaner combustion and to improve overall energy efficiency of the system 100.

In instances in which the electrolyzer 104 includes one or more electrochemical cells, the electrolyzer 104 may be operated at a substantially steady state condition (e.g., full power) associated with peak efficiency of the electrolyzer 104 to facilitate realizing additional or alternative benefits related to one or more of cost or emission reduction. For example, given that hydrogen is a highly combustible and clean-burning fuel, the electrolyzer 104 may produce hydrogen in excess of an amount required for the forming gas, and at least a portion of the excess hydrogen may be directed to augment one or more combustion processes in the oxidizing environment zone 110 of the fabrication assembly 106, as described in greater detail below. Additionally, or alternatively, the excess hydrogen produced by the electrolyzer 104 may be directed to one or more other applications within the factory to facilitate achieving reductions in overall operating cost and/or emissions of the factory. The electrolyzer 104 and the fabrication assembly 106 may be located in the same building or enclosure.

In general, the nitrogen source 102 may include any one or more of various different sources of nitrogen operable to produce nitrogen in an amount sufficient to dilute hydrogen in the forming gas mixed by the blending circuit 108. In certain implementations, the forming gas may have a volumetric ratio of nitrogen-to-hydrogen of 8:2 to 9.5:0.5, such as about 9:1. More generally, given the combustibility of hydrogen in the presence of oxygen, dilution with a large amount of nitrogen increases the likelihood that hydrogen in the forming gas is below the combustibility limit of hydrogen in air. Thus, oxygen encountered by hydrogen in the forming gas reacts to form water, rather than forming a combustible mixture. Thus, the nitrogen source 102 may include a nitrogen storage vessel, such as nitrogen tank or a device which separates oxygen and nitrogen from each other. For example, the nitrogen source 102 may remove nitrogen from air (e.g., from compressed air) to form nitrogen and nitrogen-depleted air (air with more than 21 percent oxygen, which shall be referred to herein as "oxygen stream" for the sake of brevity). For example, the nitrogen source 102 may include one or more of a pressure swing adsorber, a temperature swing adsorber, a hybrid pressure and thermal swing adsorber, or a refrigeration unit. Further, or instead, the nitrogen source 102 may include an electrochemical cell operable to electrochemically pump nitrogen or oxygen from air. The outputs of the nitrogen source 102 may include a nitrogen stream and an oxygen stream. The nitrogen may flow from the nitrogen source 102 to the blending circuit 108 via the nitrogen stream 114 (e.g., nitrogen stream conduit), where the nitrogen may be mixed with hydrogen to form the forming gas according to any one or more of the various different techniques described herein. As described in greater detail below, in instances in which the oxidizing environment zone 110 of the fabrication assembly 106 includes a furnace, the oxygen byproduct produced by the nitrogen source 102 may be directed to the oxidizing environment zone 110 to promote cleaner combustion and overall energy efficiency of the system 100.

In general, the blending circuit 108 may include any one or more of various different combinations of conduits, valves, and/or filters useful for combining nitrogen from the nitrogen stream 114 with hydrogen from the hydrogen stream 116 to generate a forming gas mixture having target relative concentrations of nitrogen and hydrogen. For example, the blending circuit 108 may include a first valve 132 and a second valve 134. The first valve 132 may be operable to control a flow of nitrogen into the forming gas stream 118, and the second valve 134 may be operable to control a flow of hydrogen into the forming gas stream 118. While operation of the blending circuit 108 is described herein in the context of operation of the first valve 132 and the second valve 134, it shall be appreciated that this is for the sake of clear and efficient explanation and that other conduit and/or valve configurations may be additionally or alternatively used to control flows of nitrogen and hydrogen into the forming gas stream 118. For example, a single three-way valve or four-way valve may be used instead of separate first and second valves.

In some cases, the relative concentrations of nitrogen and hydrogen in the forming gas may be fixed. For example, for many industrial applications such as forming sheet glass, a volumetric ratio of nitrogen-to-hydrogen in the forming gas may be about 9:1, with variations from this ratio attributable to normal fluctuations in positions of one or more of the first valve 132 and/or the second valve 134, normal fluctuations in flow of nitrogen in the nitrogen stream 114, normal fluctuations of hydrogen in the hydrogen stream 116, or a combination thereof. Mixing the forming gas according to the foregoing examples of fixed relative concentrations of nitrogen and hydrogen may have benefits associated with ease of installation and maintenance of the blending circuit 108.

While implementations of the blending circuit 108 for achieving fixed relative concentrations of nitrogen and hydrogen in the forming gas have been described, other implementations of the blending circuit 108 are additionally or alternatively possible. For example, in some instances, the first valve 132 and the second valve 134 may be independently controllable to facilitate varying the relative concentrations of nitrogen and hydrogen in the forming gas. Such variability of composition of the forming gas may, for example, may benefit various aspects of efficiency and performance of the system 100.

As an example, because a significant amount of energy is required to form the hydrogen component of the forming gas, controlling the first valve 132 and the second valve 134 relative to one another to vary the relative concentrations of nitrogen and hydrogen in the forming gas may facilitate using only as much hydrogen as may be useful for a particular set of operating conditions. More specifically, while a volumetric ratio of nitrogen-to-hydrogen of about 9:1 may be suitable for many instances of the reducing environment in the reducing environment zone 112, a ratio of about 9:1 may represent an excessive margin of hydrogen as compared to an amount of hydrogen actually required to achieve adequate oxygen scavenging under certain operating conditions. In turn, an excessive margin of hydrogen represents inefficient use of energy in the system 100. In such instances, it may be desirable to increase the volumetric ratio of nitrogen-to-hydrogen at a given overall flow rate of forming gas mixed by the blending circuit 108. Additionally, or alternatively, in some cases, an overall flow rate of the forming gas flowing along the forming gas stream 118 from the blending circuit 108 to the reducing environment zone 112 may be decreased.

As another example, for certain implementations, a volumetric ratio of nitrogen-to-hydrogen of about 9:1 may result in an inadequate amount of hydrogen for scavenging oxygen in the reducing environment zone 112. This may be the case, for instance, in the event of a progressively worsening air leak in the reducing environment zone 112. Without enough hydrogen in the forming gas mixed by the blending circuit 108, quality of the product material 117 formed in the reducing environment zone 112 may suffer. In such instances, additional hydrogen may be introduced into the reducing environment zone 112 by lowering the volumetric ratio of nitrogen-to-hydrogen at a given overall flow rate of the forming gas flowing along the forming gas stream 118 from the blending circuit 108 to the reducing environment zone 112. It shall be appreciated, however, that safety concerns associated with combustibility of hydrogen may dictate a lower limit of the volumetric ratio of nitrogen-to-hydrogen at a given overall flow rate of the forming gas. Thus, in some instances, additional hydrogen may be introduced into the reducing environment zone 112 by increasing the overall flow rate of the forming gas flowing along the forming gas stream 118 from the blending circuit 108 to the reducing environment zone 112.

Accordingly, in view of the foregoing examples, it shall be appreciated that overall efficiency and performance of the system 100 may benefit by controlling one or more of composition or overall flow rate of the forming gas mixed by the blending circuit 108 in response to changing conditions as the product material 117 is produced through continuous operation of the system 100. Toward this end, the system 100 may additionally, or alternatively, include a gas monitoring assembly 136 and a controller 138 in electrical communication with one another. The gas monitoring assembly 136 may be arranged to monitor one or more parameters along an exhaust stream 140 from the reducing environment zone 112. The controller 138 may receive, from the gas monitoring assembly 136, a first signal indicative of one or more parameters of the exhaust stream 140. Based at least in part on the first signal, the controller 138 may take any one or more of the various different remedial actions described herein. For example, as described in greater detail below, the remedial action by the controller 138 may include actuating the blending circuit 108 (e.g., actuating one or more both of the first valve 132 or the second valve 134) to change a flow rate of one or both of nitrogen along the nitrogen stream 114 or hydrogen along the hydrogen stream 116 to change the composition of the forming gas. Such a change to the composition of the forming gas based on one or more parameters of the exhaust stream 140 may balance the competing considerations of efficient energy use and quality fabrication discussed above.

The controller 138 may include a processing unit 139 and a non-transitory, computer-readable storage medium 141 having stored thereon computer-readable instructions for causing the processing unit 139 to carry out any one or more of the various different techniques described herein. Additionally, or alternatively, the controller 138 may include a user interface 143 (e.g., a keyboard, a mouse, a touchscreen, etc.) in electrical communication with the processing unit 133 and the computer-readable storage medium 141. In use, a user may provide inputs to the controller 138 via the user interface 143. In some instances, the user interface 143 may communicate information to the user, such as alerts (e.g., an indicator on a screen and/or an alarm sound) and/or performance parameters. That is, in some instances, the remedial action initiated by the controller 138 may include an alert delivered to the user interface 143.

The gas monitoring assembly 136 may include any one or more of various different sensors operable to measure one or more components in the exhaust stream 140. Some examples of such sensors include catalytic, electrochemical, metal oxide, metal oxide silicon field effect transistor (MOSFET) sensors. While the gas monitoring assembly 136 is shown as monitoring gas flow along a discrete portion of the exhaust stream 140, it shall be appreciated that this is for the sake of clear illustration and efficient explanation. Thus, unless otherwise specified or made clear from the context, it shall be appreciated that the gas monitoring assembly 136 may be distributed as useful for measuring one or more parameters of the exhaust stream 140 or any one or more other flows along any other portion of the system 100, as may be useful for achieving efficient formation of the forming gas while maintaining an oxygen-free condition in the reducing environment zone 112.

As an example, gas monitoring assembly 136 may monitor the exhaust stream 140 for one or more of hydrogen concentration or oxygen concentration. With this information included in the first signal to the controller 138, the remedial action carried out by the controller 138 may include actuating the blending circuit 108 based on the first signal from the gas monitoring assembly 136 to reduce the relative volumetric concentration of hydrogen in the forming gas mixed by the blending circuit 108. As a specific example, the controller 138 may iteratively actuate the blending circuit 108 to reduce the amount of hydrogen in the forming as gradually such that there is always a small margin of hydrogen available in the reducing environment zone 112 of the fabrication assembly 106.

In general, the fabrication assembly 106 may include an oxidizing environment zone 110 and a reducing environment zone 112. While any one or more of the various different techniques for mixing forming gases described herein may be applicable to a fabrication assembly 106 including only the reducing environment zone 112, the presence of the oxidizing environment zone 110 may facilitate achieving certain efficiencies that are not available with the reducing environment zone 112 alone. In the description that follows, these efficiencies are described in the context of fabrication of sheet glass (e.g., in a float process), an application that is both illustrative of various synergies provided by the system 100 and commercially important.

In certain implementations, the oxidizing environment zone 110 may include a furnace 142. Additionally, or alternatively, the reducing environment zone 112 may include a forming section 144 and an annealing section 146. The furnace 142 may be operable to heat the raw material (e.g., the silica and various metal oxide powders) 113 to form the intermediate material 115 as a melt receivable into the forming section 144. The forming section 144 may include, for example, a tin bath onto which the melt from the oxidizing environment zone 110 may flow to form a heated glass (e.g., glass ribbon). The annealing section 146 may receive the heated glass, and the annealing section 146 may be operable to cool (i.e., anneal) the heated glass to form the product material 117 including sheet glass. For example, the annealing section 146 may include a lehr oven having an end-to-end temperature gradient useful for annealing the intermediate material 115 as it moves through the annealing section 146 along one or more of rollers or a conveyor. To form the product material 117 including a sheet glass of high quality, each of the forming section 144 and the annealing section 146 may be oxygen-free to prevent the oxidation of the tin bath. Thus, for example, the forming gas flowing along the forming gas stream 118 may be introduced into the forming section 144 and flow into the annealing section 146 via fluid communication between the forming section 144 and the annealing section 146.

In the formation of sheet glass, the furnace 142 may require significant energy and produce substantial emissions to heat the furnace 142 to temperatures required for sheet glass fabrication. For example, for sheet glass fabrication process, the furnace 142 may heat the raw material 113 (e.g., including silica sand, soda ash, dolomite, limestone, and/or salt cake) to a temperature of about 1500° C. using combustion of fossil fuel (e.g., fuel oil and/or natural gas). Further, for industrial-scale fabrication of sheet glass, the furnace 142 may have a working area of about 5000 m². As may be appreciated from this example, it may be generally useful to direct certain byproducts associated with the forming gas to the furnace 142 to reduce the overall energy consumption of the system 100 and/or to reduce the emissions produced through operation of the furnace 142.

Thus, in some implementations, the electrolyzer 104 may be in fluid communication with the oxidizing environment zone 110 such that one or more of oxygen or hydrogen generated by the electrolyzer 104 may be directed to the oxidizing environment zone 110. For example, at least a portion of the hydrogen generated along the cathode 126 of the electrolyzer 104 may be directed to the furnace 142 along a fuel stream 148 (e.g., fuel stream conduit). As compared to a fossil fuel, combustion of hydrogen delivered in the fuel stream 148 to the furnace 142 may reduce emissions. Thus, in some instances, the electrolyzer 104 may be sized to produce enough hydrogen to meet the demands of the forming gas and to meet the fuel demand of combustion to heat the furnace 142. In such instances, furnace combustion may be carried out with hydrogen and air or hydrogen and oxygen-enriched air to displace fossil fuels while making use of conventional combustion technologies. Given that the hydrogen and oxygen are formed from only water and electricity, the reduction in emissions in displacing fossil fuel in combustion for the furnace 142 may be significant in instances in which the energy source 122 includes one or more renewable sources. As another example, at least a portion of the oxygen generated along the anode 124 of the electrolyzer 104 may be directed to the furnace 142 via a first oxygen stream 150 (e.g., oxygen stream conduit) to form oxygen-rich air useful for reducing emissions and improving the fuel efficiency of the furnace 142 and, thus, the overall energy efficiency of the system 100.

In instances in which the nitrogen source 102 separates nitrogen from air, the nitrogen-depleted air byproduct (referred to herein as "oxygen stream") may additionally, or alternatively, directed to the oxidizing environment zone 110. For example, at least a portion of the oxygen generated by the nitrogen source 102 may be directed to the furnace 142 along a second oxygen stream 152. Thus, in a manner analogous to the oxygen introduced into the furnace 142 via the first oxygen stream 150, the oxygen introduced into furnace 142 via the second oxygen stream 152 may form oxygen-rich air useful for reducing emissions and improving the fuel efficiency of the furnace 142 and, thus, the overall energy efficiency of the system 100.

While certain emissions and efficiency benefits have been described as being realized through directing one or more of hydrogen and oxygen to the furnace 142, it shall be appreciated that the use of combustion to heat the furnace 142 may be entirely eliminated in some instances. For example, the energy source 122 may be sized to support operation of the furnace 142 as an electric furnace, without combustion heating and its associated emissions. Here, again, the emissions and efficiency benefit associated with this approach to displacing fossil fuels depends on the underlying technology used by the energy source 122, with significant benefits realizable in instances in which the energy source 122 includes one or more renewable energy sources.

Given that the production of hydrogen is associated with a high energy cost and it is generally desirable to control the blending circuit 108 to provide some margin of hydrogen available in the reducing environment zone 112, the system 100 may include a hydrogen pump 154 and a recirculation circuit 156 in some implementations. To the extent the flow along the exhaust stream 140 from the annealing section 146 includes hydrogen, the hydrogen pump 154 may remove the hydrogen from the exhaust stream 140, pressurize the hydrogen, and return the pressurized hydrogen to the hydrogen stream 116 via the recirculation circuit (e.g., conduit) 156.

In certain implementations, the hydrogen pump 154 may be an electrochemical membrane hydrogen pump including at least one instance of an electrochemical cell 158, as shown in FIG. 1C. For the sake of clarity of illustration and description, only a single instance of the electrochemical cell 158 is shown in FIG. 1C. However, it shall be appreciated that the hydrogen pump 154 may include additional electrochemical cells, without departing from the scope of the present disclosure. The total number of electrochemical cells in the hydrogen pump 154 may be influenced by, among other considerations, the amount of hydrogen flowing in the exhaust stream 140 and/or the pressure required to move the hydrogen from the exhaust stream 140 to the hydrogen stream 116 via the recirculation circuit 156. For example, multiple instances of the electrochemical cell 158 may be arranged in a cascading electrochemical stack.

The electrochemical cell 158 may include a proton exchange membrane 160, an anode 162, and a cathode 164. For example, the proton exchange membrane 160 may be disposed between the anode 162 and the cathode 164. The anode 162 of the hydrogen pump 154 may be in fluid communication with the reducing environment zone 112 via the exhaust stream 140, and the cathode 164 of the hydrogen pump 154 may be in fluid communication with the recirculation circuit 156. Electrical power E may be delivered to the anode 162 and the cathode 164 to provide a positive charge along the anode 162 and a negative charge along the cathode 164.

As an example, at the anode 162, lower pressure hydrogen may separate into protons and electrons, and the electric field may drive protons across the proton exchange membrane 160 to the cathode 164. Continuing with this example, the protons may recombine at the cathode 164 to form hydrogen at a higher pressure. As may be appreciated from the foregoing, sequential pumping of hydrogen may be repeated using as many instances of one or more instances of the electrochemical cell 158 as necessary or desirable to remove a significant amount of hydrogen from the exhaust stream 140 and electrochemically pump the removed hydrogen to a target pressure. In general, the target pressure may be at least above a minimum pressure required to overcome flow resistance associated with the recirculation circuit 156 to deliver the recirculated hydrogen to the hydrogen stream (e.g., hydrogen stream conduit) 116. For example, the recirculation circuit 156 may be fluidly connected to the hydrogen stream conduit at the blending circuit 108. In this case, the second valve 134 may be a three-way valve. Alternatively, the recirculation circuit 156 may be fluidly connected to the hydrogen stream conduit and/or to the forming gas stream conduit 118 at any other suitable location.

In certain implementations, the hydrogen pump 154 may advantageously provide information indicative of one or more parameters of the exhaust stream 140 and may communicate such information to one or more of the gas monitoring assembly 136 and/or the controller 138, such as may be useful for adjusting a flow of one or more of nitrogen or hydrogen through the blending circuit 108 to achieve an appropriate margin of hydrogen for the reducing environment zone 112. For example, in instances in which the hydrogen pump 154 includes the electrochemical cell 158, the voltage of the electrochemical cell 158 may be indicative of the concentration of hydrogen in the exhaust stream 140 and/or of the amount of a leak in the reducing environment zone 112. Given its diagnostic value, the voltage of the electrochemical cell 158 may be included, for example, in the first signal communicated from the gas monitoring assembly 136 to the controller 138 according to any one or more of the various different control techniques described herein.

Given that the exhaust stream 140 may be generally dry, the controller 138 may reverse operation of the electrochemical cell 158 in a regenerative humidification and drying scheme. That is, through reversal of operation of the electrochemical cell 158, flow along the anode 162 may be humidified only as a transient to facilitate operating the electrochemical cell 158. A small amount of water may be added in addition to make up for losses in the reversal process.

While energy has been described as being delivered to the system 100 by the energy source 122, it shall be appreciated that the energy source 122 may be intermittent in some instances. This may be the case, for example, in instances in which the energy source 122 includes one or more renewable energy sources. Thus, in some implementations, the system 100 may include an energy storage device 166, which may include a battery or supercapacitor. The energy storage device 166 may be charged by the energy source 122 when the energy source has sufficient extra energy available for charging. The energy storage device 166 may be in electrical communication with one or more of the by the energy source 122, nitrogen source 102, the electrolyzer 104, and the controller 138. The controller 138 may, for example, receive a second signal indicative of status of electricity supply from the energy source 122. That is, the second signal may indicate an intermittent or otherwise incompatible state of the energy source 122 with the energy demands of the system 100. Thus, continuing with this example, the remedial action initiated by the controller 138 may include sourcing electricity from the energy source 122, the energy storage device 166, or a combination thereof, based on the second signal. For example, in instances in which the energy source 122 is indicated as being unavailable or incapable of providing sufficient amount of electricity required by the system 100 components, the energy storage device 166 may provide electricity to one or more of the nitrogen source 102, the electrolyzer 104, and/or the blending circuit 108 according to any one or more of the various different techniques described herein. Further, or instead, the energy storage device 166 may be used to normalize the output hydrogen production, oxygen production, nitrogen production, and purified water production, with the availability duty cycle of renewables with a planned operation cycle of the fabrication assembly 106.

In certain implementations, the system 100 may include a reservoir 168 in fluid communication with the water source 120 and the electrolyzer 104 to reduce the potential impact of instability of the water source 120 on the flow of forming gas to the reducing environment zone 112. For example, the controller 138 may receive a third signal indicative of water flow from the water source 120. Continuing with this example, the remedial action initiated by the controller 138 may include sourcing water from the reservoir 168, the water source 120, or a combination thereof, based on the third signal indicative of water flow from the water source 120. The water reservoir 168 may be a water tank that is fluidly connected to the water source 120 and which is filled from the water source 120 when excess water is available from the water source 120.

Figure 2A:
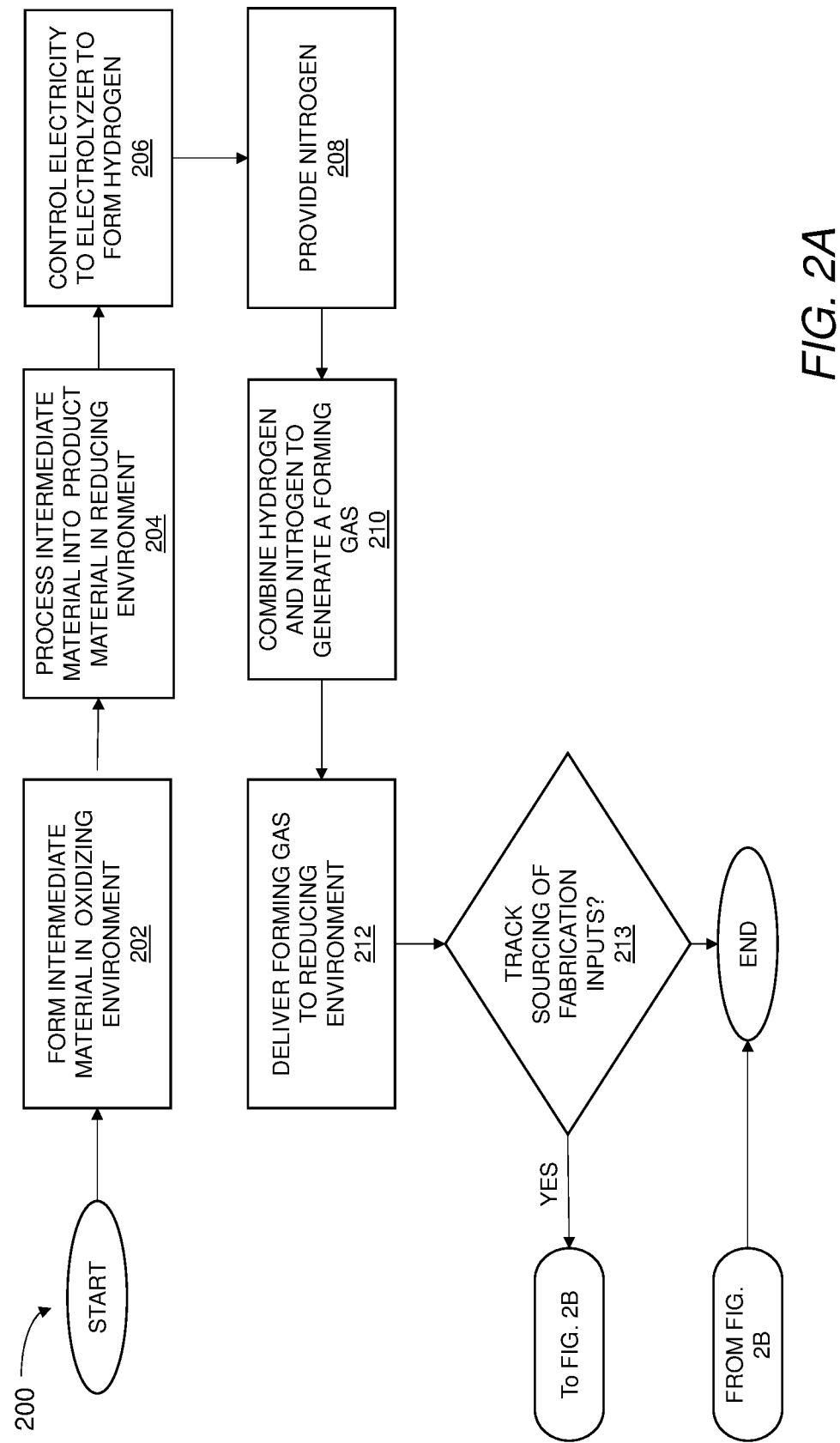

FIG. 2A is a flow chart of an exemplary method 200 of generating a reducing ambient for industrial fabrication, such as float glass fabrication. Unless otherwise specified or made clear from the context, the exemplary method 200 may be implemented using any one or more of the various different systems, and components thereof, described herein. Thus, for example, the exemplary method 200 may be implemented as computer-readable instructions stored on the computer-readable storage medium 141 and executable by the processing unit 139 of the controller 138 to operate the system 100, as shown in FIG. 1A.

As shown in step 202, the exemplary method 200 may include forming an intermediate material from raw material in an optional oxidizing environment. This may include any one or more of the various different material processing techniques that may take place in an oxidizing environment and, in particular, may include melting raw material in a furnace to form a melt as part of fabrication of float glass.

As shown in step 204, the exemplary method 200 may include processing the intermediate material into a product material in a reducing environment. This may include any one or more of the various different material processing techniques that require or at least benefit from a reducing environment, such as an oxygen-free environment. Thus, as a specific example, this may include forming the melt into a float glass on a tin melt in a forming section and moving the float glass to an annealing section, where the float glass may be cooled to form sheet glass, as described herein.

As shown in step 206, the exemplary method 200 may include controlling electricity to an electrolyzer to electrolyze water into hydrogen. Controlling electricity to the electrolyzer may include, for example, adjusting electricity to the electrolyzer based at least in part on a concentration of hydrogen and/or oxygen in an exhaust stream from the reducing environment. Further, or instead, controlling electricity to the electrolyzer may include sourcing the electricity from the energy source 122, the energy storage device 166, or both, as may be useful for maintaining continuous operation of the electrolyzer through one or more interruptions of electricity from the energy source 122.

As shown in step 208, the exemplary method 200 may include providing nitrogen. Unless otherwise specified or made clear from the context, this may include any manner and form of nitrogen production described herein. Thus, for example, providing nitrogen may include separating nitrogen from air using pressure-swing and/or temperature-swing adsorption.

As shown in step 210, the exemplary method 200 may include combining the hydrogen and the nitrogen with one another in a blending circuit to generate a forming gas. For example, combining the hydrogen and the nitrogen with one another in the blending circuit may include receiving a first signal indicative of one or more parameters of an exhaust stream from the reducing environment and adjusting the blending circuit based on the first signal. For example, the first signal may be indicative of one or more of a concentration of hydrogen or oxygen in the exhaust stream and, in some cases, adjusting the blending circuit may include iteratively reducing the amount of hydrogen in the exhaust stream to achieve a predetermined margin for scavenging in the reducing environment.

As shown in step 212, exemplary method 200 may include delivering the forming gas to the reducing environment to scavenge oxygen in the reducing environment. For example, the forming gas may be delivered continuously to the reducing environment to scavenge oxygen in the reducing environment.

Having described various aspects of oxygen-free fabrication useful for emission and/or energy reduction that may individually or collectively offer environmental benefits compared to the use of conventional techniques, it shall be appreciated that it may be useful to track such benefits through the fabrication of a product. Such tracking may be useful, if not necessary, for meeting certain types of environmental certifications.

Accordingly, if the exemplary method 200 includes tracking the sourcing of fabrication inputs in step 213, then the exemplary method 200 may include receiving a plurality of sourcing indications in step 214 of FIG. 2B corresponding to provenance of one or more of energy, water, nitrogen, and raw material to be used in the fabrication of a product. This information may be received, for example, as a manual input through a user interface. Additionally, or alternatively, this information may be gathered automatically, such as may be the case with electricity sourced from one or more renewable energy sources.

As shown in step 216 of FIG. 2B, the exemplary method 200 may include tracking each sourcing indication on a time or lot basis from the raw material through to the product material. Such tracking may be useful for identifying product material that meets certain standards with respect to sourcing. As an example, through such tracking, it may be possible to identify product material formed using only raw materials, air, and water (e.g., in instances in which electricity is provided by one or mor renewable sources).

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system, comprising:
a nitrogen source for producing a nitrogen stream;
an electrolyzer for producing a hydrogen stream and an oxygen byproduct;
a fabrication assembly including:
an oxidizing environment zone in fluid communication with the electrolyzer operable to convert a raw material into an intermediate material, wherein the oxidizing environment zone includes a furnace and at least a portion of the oxygen byproduct is directed to the furnace;
a reducing environment zone operable to receive the intermediate material and process the intermediate material into a product material; and
a blending circuit in fluid communication with the nitrogen source, the electrolyzer, and the reducing environment zone, and wherein the blending circuit is configured to combine the nitrogen stream from the nitrogen source with the hydrogen stream from the electrolyzer to mix a forming gas and to flow the forming gas from the blending circuit into the reducing environment zone of the fabrication assembly.

2. The system of claim 1, wherein the nitrogen source includes a pressure swing adsorber in fluid communication with the oxidizing environment zone such that oxygen generated by the pressure swing adsorber is flowable to the oxidizing environment zone.

3. The system of claim 1, wherein the electrolyzer includes an anode, a cathode, and an electrolyte therebetween, and the blending circuit is in fluid communication with the cathode of the electrolyzer.

4. The system of claim 1, further comprising a gas monitoring assembly and a controller, wherein:
the gas monitoring assembly is arranged to monitor one or more parameters of an exhaust stream from the reducing environment zone,
the controller is in electrical communication with the gas monitoring assembly, and
the controller is configured to receive a first signal indicative of the one or more parameters of the exhaust stream and to initiate a remedial action based at least in part on the first signal from the gas monitoring assembly.

5. The system of claim 4, wherein:
the controller is further in electrical communication with the blending circuit, and
the remedial action includes actuating the blending circuit to change a flow rate of one or both of the nitrogen stream or the hydrogen stream based on the first signal indicative of the one or more parameters of the exhaust stream.

6. The system of claim 5, further comprising a recirculation circuit and a hydrogen pump, wherein:
the hydrogen pump includes an electrochemical cell having an anode, a cathode, and a proton exchange membrane,
the anode of the hydrogen pump is in fluid communication with the exhaust stream from the reducing environment zone,
the cathode of the hydrogen pump is in fluid communication with the recirculation circuit, and
the recirculation circuit is configured to combine pressurized hydrogen from the hydrogen pump with the hydrogen stream from the electrolyzer.

7. The system of claim 6, wherein the first signal indicative of the one or more parameters of the exhaust stream includes a voltage of the electrochemical cell of the hydrogen pump.

8. The system of claim 4, further comprising an energy storage device in electrical communication with at least two of the nitrogen source, the electrolyzer, or the controller, wherein:
the controller is further configured to receive a second signal indicative of electricity from an energy source, and
the remedial action of the controller further includes sourcing electricity from the energy source, the energy storage device, or a combination thereof, based on the second signal indicative of electricity from the energy source.

9. The system of claim 4, further comprising a reservoir in fluid communication with a water source and the electrolyzer, wherein:
the controller is further configured to receive a third signal indicative of water flow from the water source, and
the remedial action of the controller further includes sourcing water from the reservoir, the water source, or a combination thereof, based on the third signal indicative of water flow from the water source.

10. The system of claim 1, wherein the fabrication assembly comprises a float glass fabrication assembly which is fluidly connected to the electrolyzer via a hydrogen stream conduit, the blending circuit and a forming gas stream conduit.

11. The system of claim 10, wherein:
the reducing environment zone includes a float glass forming section containing a tin bath, and an annealing section,
the furnace is operable to produce the intermediate material comprising a glass melt,
the forming section is operable to form a float glass ribbon from the glass melt provided onto the tin bath, and
the annealing section is operable to cool the float glass ribbon to form the product material comprising sheet glass.

12. A method, comprising:
electrolyzing water into hydrogen and oxygen;
combining the hydrogen with nitrogen to generate forming gas;
delivering the forming gas to a reducing environment zone;
providing oxygen generated by the electrolyzing to an oxidizing environment zone; and
processing an intermediate material into a product material in the reducing environment zone.

13. The method of claim 12, further comprising forming the intermediate material from a raw material in the oxidizing environment zone.

14. The method of claim 13, further comprising separating nitrogen from air using pressure-swing adsorption to form the nitrogen which is combined with the hydrogen.

15. The method of claim 14, further comprising:
providing oxygen generated by the pressure swing adsorption to the oxidizing environment zone; and
providing hydrogen generated by the electrolyzing to the oxidizing environment zone.

16. The method of claim 12, further comprising receiving a first signal indicative of one or more parameters of an exhaust stream from the reducing environment zone and adjusting a volumetric ratio of nitrogen-to-hydrogen based on the first signal.

17. The method of claim 16, wherein the forming gas has the volumetric ratio of nitrogen-to-hydrogen of 8:2 to 9.5:0.5, and wherein the first signal is indicative of a concentration of one or more of hydrogen or oxygen in the exhaust stream from the reducing environment zone.

18. The method of claim 13, wherein:
forming the intermediate material from the raw material in the oxidizing environment zone comprises forming a glass melt from a raw material powder in the furnace; and
processing the intermediate material into the product material comprises processing the glass melt into a float glass ribbon on a tin melt and then cooling the float glass ribbon into sheet glass.

* * * * *